US012786196B1

(12) United States Patent
Berkovitz et al.

(10) Patent No.: US 12,786,196 B1
(45) Date of Patent: Nov. 3, 2026

(54) PERMISSION ESCALATION DETECTION UTILIZING UNIFIED IDENTITY MAPPING AND PERMISSION DETECTION

(71) Applicant: Wiz, Inc., New York, NY (US)

(72) Inventors: Avihai Berkovitz, Tel Aviv (IL); George Pisha, Giv'atayim (IL); Yaniv Joseph Oliver, Tel Aviv (IL); Udi Reitblat, Tel Aviv (IL)

(73) Assignee: Wiz, Inc., New York, NY (US)

( * ) Notice: Subject to any disclaimer, the term of this patent is extended or adjusted under 35 U.S.C. 154(b) by 268 days.

(21) Appl. No.: 17/812,918

(22) Filed: Jul. 15, 2022

Related U.S. Application Data

(60) Provisional application No. 63/222,719, filed on Jul. 16, 2021.

(51) Int. Cl.

| | |
|---|---|
| ***H04L 43/02*** | (2022.01) |
| ***G06F 21/55*** | (2013.01) |
| ***G06F 21/62*** | (2013.01) |
| ***H04L 9/40*** | (2022.01) |
| *H04L 43/12* | (2022.01) |
| *H04L 43/20* | (2022.01) |

(52) U.S. Cl.
CPC .......... *H04L 63/102* (2013.01); *H04L 63/105* (2013.01); *H04L 63/1416* (2013.01)

(58) Field of Classification Search
CPC .. H04L 63/102; H04L 63/105; H04L 63/1416
See application file for complete search history.

(56) References Cited

U.S. PATENT DOCUMENTS

| | | | |
|---|---|---|---|
| 6,910,132 | B1 | 6/2005 | Bhattacharya |
| 7,627,652 | B1 | 12/2009 | Commons et al. |
| 7,784,101 | B2 | 8/2010 | Verbowski et al. |
| 8,104,075 | B2 | 1/2012 | Spector |
| 8,200,965 | B2 | 6/2012 | Fujibayashi et al. |
| 8,320,558 | B1 | 11/2012 | Zea |

(Continued)

FOREIGN PATENT DOCUMENTS

| | | |
|---|---|---|
| CN | 106462439 A | 2/2017 |
| CN | 109240804 A | 1/2019 |

(Continued)

OTHER PUBLICATIONS

AWS, AWS managed policies for job functions, Oct. 26, 2021, https://web.archive.org/web/20211026212847/https:// docs.aws.amazon.com/IAM/latesUUserGuide/access_policiesjob-functions.html (Year: 2021).

(Continued)

*Primary Examiner* — Venkat Perungavoor
(74) *Attorney, Agent, or Firm* — M&B IP Analysts, LLC

(57) ABSTRACT

A system and method for detecting a permission escalation event includes querying a security graph to detect a second principal node, representing a second principal, the second principal having a permission to assume a first principal, represented by a first principal node, wherein the security graph stores a representation of a cloud computing environment in which the first principal and second principal are deployed; determining that the first principal node has access to a permission which is not accessible by the second principal node; and generating a permission escalation event.

17 Claims, 8 Drawing Sheets

(56) References Cited

U.S. PATENT DOCUMENTS 8,352,431 B1 1/2013 Protopopov et al.
8,412,688 B1 4/2013 Armangau et al.
8,413,239 B2 4/2013 Sutton
8,417,967 B2 4/2013 Foster et al.
8,499,354 B1 7/2013 Satish et al.
8,595,822 B2 11/2013 Schrecker et al.
8,701,200 B2 4/2014 Naldurg et al.
8,789,049 B2 7/2014 Hutchins et al.
8,813,234 B1 8/2014 Bowers et al.
8,898,481 B1 11/2014 Osburn, III et al.
8,904,525 B1 12/2014 Hodgman et al.
8,914,406 B1 12/2014 Haugsnes
9,009,836 B1 4/2015 Yarykin et al.
9,094,379 B1 7/2015 Miller
9,119,017 B2 8/2015 Sinha
9,165,142 B1 10/2015 Sanders et al.
9,172,621 B1 10/2015 Dippenaar
9,185,136 B2 11/2015 Dulkin et al.
9,330,273 B2 5/2016 Khetawat et al.
9,369,433 B1 6/2016 Paul
9,419,996 B2 8/2016 Porat
9,438,634 B1 9/2016 Ross et al.
9,459,803 B1 10/2016 Yang et al.
9,467,473 B2 10/2016 Jayaraman
9,535,731 B2 1/2017 Ashley et al.
9,544,327 B1 1/2017 Sharma et al.
9,563,385 B1 2/2017 Kowalski et al.
9,569,328 B2 2/2017 Pavlov et al.
9,582,662 B1 2/2017 Messick et al.
9,596,235 B2 3/2017 Badam et al.
9,607,104 B1 3/2017 Turner et al.
9,621,595 B2 4/2017 Lian et al.
9,646,172 B1 5/2017 Hahn
9,661,009 B1 5/2017 Karandikar et al.
9,665,465 B1 5/2017 Jain et al.
9,672,355 B2 6/2017 Titonis et al.
9,712,503 B1 7/2017 Ahmed
9,892,261 B2 2/2018 Joram et al.
9,992,186 B1 * 6/2018 Drozd .................. H04L 63/102
10,002,247 B2 6/2018 Suarez et al.
10,009,337 B1 * 6/2018 Fischer ............... H04L 67/1097
10,032,032 B2 7/2018 Suarez et al.
10,044,723 B1 * 8/2018 Fischer ................. H04L 63/102
10,135,826 B2 11/2018 Reddy
10,205,638 B1 2/2019 Angrish et al.
10,229,125 B2 3/2019 Goodman et al.
10,255,370 B2 4/2019 Carpenter et al.
10,360,025 B2 7/2019 Foskett et al.
10,412,103 B2 9/2019 Haugsnes
10,412,109 B2 9/2019 Loureiro et al.
10,459,664 B1 10/2019 Dreier et al.
10,509,909 B2 12/2019 Andriani
10,511,590 B1 12/2019 Bosch et al.
10,536,471 B1 1/2020 Derbeko et al.
10,540,499 B2 1/2020 Wailly et al.
10,552,610 B1 2/2020 Vashisht et al.
10,554,507 B1 2/2020 Siddiqui et al.
10,567,468 B2 2/2020 Perlmutter
10,572,226 B2 2/2020 Biskup et al.
10,574,675 B2 2/2020 Peppe et al.
10,623,386 B1 4/2020 Bernat et al.
10,630,642 B2 4/2020 Clark et al.
10,664,619 B1 5/2020 Marelas
10,691,636 B2 6/2020 Tabaaloute et al.
10,721,260 B1 7/2020 Schlarp et al.
10,725,775 B2 7/2020 Suarez et al.
10,728,252 B2 * 7/2020 Desai .................... H04L 63/029
10,735,430 B1 8/2020 Stoler
10,735,442 B1 8/2020 Swackhamer
10,791,138 B1 9/2020 Siddiqui et al.
10,803,188 B1 10/2020 Rajput et al.
10,812,521 B1 10/2020 Sharifi Mehr
10,831,898 B1 * 11/2020 Wagner ................... G06F 9/547
10,887,333 B1 1/2021 Pereira et al.
10,915,626 B2 2/2021 Tang
10,924,503 B1 2/2021 Pereira et al.
10,949,406 B1 3/2021 Calvo et al.
10,972,484 B1 4/2021 Swackhamer
10,984,098 B2 4/2021 Lavi et al.
10,997,293 B2 5/2021 Wiest et al.
11,005,860 B1 5/2021 Glyer et al.
11,016,954 B1 5/2021 Babocichin et al.
11,044,118 B1 6/2021 Reed et al.
11,055,414 B2 7/2021 Claes
11,064,032 B1 7/2021 Yang et al.
11,099,976 B2 8/2021 Khakare et al.
11,102,231 B2 8/2021 Kraning et al.
11,165,652 B1 11/2021 Byrne
11,245,730 B2 2/2022 Bailey
11,256,759 B1 2/2022 Chen et al.
11,271,961 B1 3/2022 Berger
11,277,432 B2 3/2022 Hassanzadeh et al.
11,295,009 B2 4/2022 Brossard et al.
11,334,670 B2 5/2022 Franco et al.
11,336,555 B2 5/2022 Soh et al.
11,366,897 B1 6/2022 Ramanathan et al.
11,388,183 B2 7/2022 Hoopes et al.
11,397,808 B1 7/2022 Prabhu et al.
11,405,426 B2 8/2022 Nguyen
11,418,528 B2 8/2022 Deardorff et al.
11,442,989 B2 9/2022 Dvinov et al.
11,444,974 B1 9/2022 Shakhzadyan
11,483,317 B1 * 10/2022 Bolignano ............ G06F 21/577
11,496,498 B2 11/2022 Wright et al.
11,496,519 B1 11/2022 Gupta et al.
11,503,063 B2 11/2022 Rao
11,507,672 B1 11/2022 Pagnozzi et al.
11,509,658 B1 11/2022 Kulkarni
11,516,222 B1 11/2022 Srinivasan et al.
11,520,207 B2 12/2022 Brown et al.
11,520,907 B1 12/2022 Borowiec et al.
11,546,360 B2 1/2023 Woodford et al.
11,556,659 B1 1/2023 Kumar et al.
11,558,401 B1 1/2023 Vashisht et al.
11,558,414 B1 1/2023 Nguyen
11,558,423 B2 1/2023 Gordon et al.
11,567,751 B2 1/2023 Cosentino et al.
11,570,090 B2 1/2023 Shen et al.
11,575,696 B1 2/2023 Ithal et al.
11,593,485 B1 2/2023 Briliauskas et al.
11,606,378 B1 3/2023 Delpont et al.
11,614,956 B2 3/2023 Tsirkin et al.
11,645,390 B2 5/2023 Vijayvargiya et al.
11,651,055 B2 5/2023 Saillet et al.
11,662,928 B1 5/2023 Kumar et al.
11,663,340 B2 5/2023 Wu et al.
11,669,386 B1 6/2023 Abrol
11,695,785 B2 7/2023 Ithal et al.
11,700,233 B2 7/2023 St. Pierre
11,711,374 B2 7/2023 Ross et al.
11,720,685 B2 8/2023 Gwilliams
11,750,566 B1 9/2023 Montilla Lugo
11,757,844 B2 9/2023 Xiao
11,770,398 B1 9/2023 Erlingsson
11,792,284 B1 10/2023 Nanduri
11,799,874 B1 10/2023 Lichtenstein et al.
11,803,766 B1 10/2023 Srinivasan
11,831,670 B1 11/2023 Molls et al.
11,836,250 B2 12/2023 Grossman et al.
11,841,945 B1 12/2023 Fogel
11,902,282 B2 2/2024 Ghiold et al.
11,914,707 B1 2/2024 Ramanathan et al.
11,922,220 B2 3/2024 Haghighat et al.
11,936,785 B1 3/2024 Shemesh et al.
11,960,609 B2 4/2024 Gokhman et al.
11,973,770 B1 4/2024 Miran et al.
11,991,216 B1 * 5/2024 Venkatachari .......... H04L 63/20
12,003,541 B2 6/2024 Shulman et al.
12,008,222 B1 6/2024 Niv et al.
12,010,127 B1 6/2024 Niv et al.
12,019,770 B2 6/2024 Nilsson et al.
12,021,901 B2 6/2024 Gavish et al.
12,050,696 B2 7/2024 Pieno et al.
12,058,177 B2 8/2024 Crabtree et al.

(56) References Cited

U.S. PATENT DOCUMENTS

| | | | |
|---|---|---|---|
| 12,063,305 | B2 | 8/2024 | Ip et al. |
| 12,164,652 | B1 | 12/2024 | Li et al. |
| 12,166,785 | B2 | 12/2024 | Yellapragada et al. |
| 12,219,048 | B1 | 2/2025 | Shemesh et al. |
| 12,244,627 | B2 | 3/2025 | Lidgi et al. |
| 12,267,326 | B2 | 4/2025 | Lidgi et al. |
| 12,395,488 | B2 | 8/2025 | Lidgi et al. |
| 12,437,080 | B2 | 10/2025 | Dodge et al. |
| 12,500,920 | B2 | 12/2025 | Crabtree et al. |
| 12,506,755 | B2 | 12/2025 | Lidgi et al. |
| 12,537,837 | B2 | 1/2026 | Reed et al. |
| 2002/0133586 | A1 | 9/2002 | Shanklin et al. |
| 2002/0184486 | A1 | 12/2002 | Kershenbaum et al. |
| 2003/0188194 | A1 | 10/2003 | Currie et al. |
| 2003/0217039 | A1 | 11/2003 | Kurtz et al. |
| 2004/0054681 | A1 | 3/2004 | Pitts |
| 2004/0103278 | A1 | 5/2004 | Abhishek et al. |
| 2005/0050365 | A1 | 3/2005 | Seki et al. |
| 2005/0071630 | A1 | 3/2005 | Thornton et al. |
| 2005/0251863 | A1 | 11/2005 | Sima |
| 2005/0283645 | A1 | 12/2005 | Turner et al. |
| 2007/0006304 | A1 | 1/2007 | Kramer et al. |
| 2007/0271360 | A1 | 11/2007 | Sahita et al. |
| 2008/0075283 | A1 | 3/2008 | Takahashi |
| 2008/0104588 | A1 | 5/2008 | Barber et al. |
| 2008/0221833 | A1 | 9/2008 | Brown et al. |
| 2008/0307020 | A1 | 12/2008 | Ko et al. |
| 2009/0031143 | A1 | 1/2009 | Hodzic |
| 2009/0106256 | A1 | 4/2009 | Safari et al. |
| 2009/0271863 | A1* | 10/2009 | Govindavajhala et al. ................. G06F 21/577 |
| 2010/0192201 | A1 | 7/2010 | Shimoni et al. |
| 2010/0242082 | A1 | 9/2010 | Keene et al. |
| 2010/0263049 | A1 | 10/2010 | Cross et al. |
| 2010/0274970 | A1 | 10/2010 | Treuhaft et al. |
| 2010/0281275 | A1 | 11/2010 | Lee et al. |
| 2011/0035802 | A1 | 2/2011 | Arajujo, Jr. et al. |
| 2011/0055361 | A1 | 3/2011 | Dehaan |
| 2011/0276806 | A1 | 11/2011 | Casper et al. |
| 2012/0110574 | A1 | 5/2012 | Kumar |
| 2012/0110651 | A1 | 5/2012 | Van Biljon et al. |
| 2012/0255003 | A1 | 10/2012 | Sallam |
| 2012/0297206 | A1 | 11/2012 | Nord et al. |
| 2012/0311696 | A1 | 12/2012 | Datsenko et al. |
| 2013/0054890 | A1 | 2/2013 | Desai et al. |
| 2013/0124669 | A1 | 5/2013 | Anderson et al. |
| 2013/0160119 | A1 | 6/2013 | Sartin |
| 2013/0160129 | A1 | 6/2013 | Sartin |
| 2014/0096134 | A1 | 4/2014 | Barak |
| 2014/0115578 | A1 | 4/2014 | Cooper et al. |
| 2014/0237537 | A1 | 8/2014 | Manmohan |
| 2014/0259092 | A1 | 9/2014 | Boucher et al. |
| 2014/0317677 | A1 | 10/2014 | Vaidya |
| 2014/0325170 | A1 | 10/2014 | Aswathanarayana et al. |
| 2014/0337613 | A1 | 11/2014 | Martini |
| 2015/0033305 | A1 | 1/2015 | Shear |
| 2015/0055647 | A1 | 2/2015 | Roberts |
| 2015/0058993 | A1 | 2/2015 | Choi et al. |
| 2015/0067850 | A1 | 3/2015 | Baikalov |
| 2015/0095995 | A1 | 4/2015 | Bhalerao |
| 2015/0150072 | A1 | 5/2015 | Doctor et al. |
| 2015/0161394 | A1 | 6/2015 | Ferragut et al. |
| 2015/0163192 | A1 | 6/2015 | Jain |
| 2015/0172321 | A1 | 6/2015 | Kirti et al. |
| 2015/0199531 | A1 | 7/2015 | Ismael et al. |
| 2015/0254364 | A1 | 9/2015 | Piduri et al. |
| 2015/0310215 | A1 | 10/2015 | McBride et al. |
| 2015/0319160 | A1 | 11/2015 | Ferguson et al. |
| 2015/0341359 | A1 | 11/2015 | Yang et al. |
| 2016/0063037 | A1 | 3/2016 | Savkli |
| 2016/0078231 | A1 | 3/2016 | Bach et al. |
| 2016/0103669 | A1 | 4/2016 | Gamage et al. |
| 2016/0105454 | A1 | 4/2016 | Li |
| 2016/0140352 | A1 | 5/2016 | Nickolov |
| 2016/0156664 | A1 | 6/2016 | Nagaratnam |
| 2016/0224600 | A1 | 8/2016 | Munk |
| 2016/0266800 | A1 | 9/2016 | Klee et al. |
| 2016/0299708 | A1 | 10/2016 | Yang et al. |
| 2016/0366185 | A1 | 12/2016 | Lee et al. |
| 2017/0026416 | A1 | 1/2017 | Carpenter et al. |
| 2017/0026419 | A1 | 1/2017 | Martini et al. |
| 2017/0034198 | A1 | 2/2017 | Powers et al. |
| 2017/0060483 | A1 | 3/2017 | Klee et al. |
| 2017/0070506 | A1 | 3/2017 | Reddy |
| 2017/0104755 | A1 | 4/2017 | Arregoces |
| 2017/0111384 | A1 | 4/2017 | Loureiro et al. |
| 2017/0126712 | A1 | 5/2017 | Crabtree et al. |
| 2017/0163650 | A1 | 6/2017 | Seigel et al. |
| 2017/0180421 | A1 | 6/2017 | Shieh et al. |
| 2017/0181015 | A1 | 6/2017 | Ngo et al. |
| 2017/0185784 | A1 | 6/2017 | Madou |
| 2017/0187686 | A1 | 6/2017 | Shaikh et al. |
| 2017/0187743 | A1 | 6/2017 | Madou |
| 2017/0200122 | A1* | 7/2017 | Edson .................. H04L 63/104 |
| 2017/0223024 | A1 | 8/2017 | Desai |
| 2017/0230179 | A1 | 8/2017 | Mannan et al. |
| 2017/0237560 | A1 | 8/2017 | Mueller et al. |
| 2017/0257347 | A1 | 9/2017 | Yan |
| 2017/0285978 | A1 | 10/2017 | Manasse |
| 2017/0300690 | A1 | 10/2017 | Ladnai et al. |
| 2017/0374136 | A1 | 12/2017 | Ringdahl |
| 2018/0004950 | A1 | 1/2018 | Gupta et al. |
| 2018/0026995 | A1 | 1/2018 | Dufour et al. |
| 2018/0027009 | A1 | 1/2018 | Santos |
| 2018/0063290 | A1 | 3/2018 | Yang et al. |
| 2018/0081640 | A1 | 3/2018 | Collins |
| 2018/0083987 | A1 | 3/2018 | Kislitsin |
| 2018/0101622 | A1 | 4/2018 | Helvik et al. |
| 2018/0137174 | A1 | 5/2018 | Cahana et al. |
| 2018/0150412 | A1 | 5/2018 | Manasse |
| 2018/0159882 | A1 | 6/2018 | Brill |
| 2018/0181310 | A1 | 6/2018 | Feinberg et al. |
| 2018/0191726 | A1 | 7/2018 | Luukkala |
| 2018/0198765 | A1 | 7/2018 | Maybee et al. |
| 2018/0213002 | A1 | 7/2018 | Figovsky et al. |
| 2018/0219888 | A1* | 8/2018 | Apostolopoulos .... G06F 21/554 |
| 2018/0234459 | A1 | 8/2018 | Kung |
| 2018/0239902 | A1 | 8/2018 | Godard |
| 2018/0248902 | A1 | 8/2018 | Dănilă-Dumitrescu et al. |
| 2018/0260566 | A1 | 9/2018 | Chaganti et al. |
| 2018/0270268 | A1 | 9/2018 | Gorodissky et al. |
| 2018/0278639 | A1 | 9/2018 | Bernstein et al. |
| 2018/0288129 | A1 | 10/2018 | Joshi et al. |
| 2018/0307736 | A1* | 10/2018 | Balakrishnan ...... G06F 16/2246 |
| 2018/0309747 | A1 | 10/2018 | Sweet et al. |
| 2018/0321993 | A1 | 11/2018 | McClory |
| 2018/0341768 | A1 | 11/2018 | Marshall et al. |
| 2018/0349612 | A1 | 12/2018 | Harel et al. |
| 2018/0359058 | A1 | 12/2018 | Kurian |
| 2018/0359059 | A1 | 12/2018 | Kurian |
| 2018/0367548 | A1 | 12/2018 | Stokes et al. |
| 2019/0007271 | A1 | 1/2019 | Rickards et al. |
| 2019/0018961 | A1 | 1/2019 | Kostyushko et al. |
| 2019/0043201 | A1 | 2/2019 | Strong et al. |
| 2019/0058722 | A1 | 2/2019 | Levin et al. |
| 2019/0068617 | A1 | 2/2019 | Coleman |
| 2019/0068627 | A1 | 2/2019 | Thampy |
| 2019/0081963 | A1 | 3/2019 | Waghorn |
| 2019/0089720 | A1 | 3/2019 | Aditham et al. |
| 2019/0095626 | A1 | 3/2019 | Mohan |
| 2019/0104140 | A1 | 4/2019 | Gordeychik et al. |
| 2019/0116111 | A1 | 4/2019 | Izard et al. |
| 2019/0121986 | A1 | 4/2019 | Stopel et al. |
| 2019/0132350 | A1 | 5/2019 | Smith et al. |
| 2019/0149604 | A1 | 5/2019 | Jahr |
| 2019/0166129 | A1 | 5/2019 | Gaetjen et al. |
| 2019/0171811 | A1 | 6/2019 | Daniel et al. |
| 2019/0191417 | A1 | 6/2019 | Baldemair et al. |
| 2019/0205267 | A1 | 7/2019 | Richey et al. |
| 2019/0207966 | A1 | 7/2019 | Vashisht et al. |
| 2019/0220298 | A1 | 7/2019 | Jiao et al. |
| 2019/0220575 | A1 | 7/2019 | Boudreau et al. |
| 2019/0229915 | A1 | 7/2019 | Digiambattista et al. |
| 2019/0235900 | A1 | 8/2019 | Singh et al. |

(56) References Cited

U.S. PATENT DOCUMENTS

2019/0236409 A1 8/2019 Van Der Stockt et al.
2019/0245883 A1 8/2019 Gorodissky et al.
2019/0260764 A1 8/2019 Humphrey et al.
2019/0266508 A1 8/2019 Bunyk et al.
2019/0268353 A1 8/2019 Ahuja et al.
2019/0278928 A1 9/2019 Rungta et al.
2019/0289035 A1 9/2019 Ahuja et al.
2019/0327258 A1 10/2019 Choi et al.
2019/0327271 A1 10/2019 Saxena et al.
2019/0334715 A1 10/2019 Gray
2019/0354675 A1 11/2019 Gan et al.
2019/0377988 A1 12/2019 Qi et al.
2020/0007314 A1 1/2020 Vouk et al.
2020/0007569 A1 1/2020 Dodge et al.
2020/0012818 A1 1/2020 Levin et al.
2020/0019469 A1 1/2020 Khan et al.
2020/0021609 A1 1/2020 Kuppanna et al.
2020/0021994 A1 1/2020 Ranjbar et al.
2020/0028862 A1 1/2020 Lin
2020/0044916 A1 2/2020 Kaufman et al.
2020/0050440 A1 2/2020 Chuppala et al.
2020/0074360 A1 3/2020 Humphries et al.
2020/0082094 A1 3/2020 McAllister et al.
2020/0106782 A1 4/2020 Sion
2020/0117434 A1 4/2020 Biskup et al.
2020/0125352 A1 4/2020 Kannan
2020/0137097 A1 4/2020 Zimmermann et al.
2020/0137125 A1 4/2020 Patnala et al.
2020/0145405 A1 5/2020 Bosch et al.
2020/0162431 A1 5/2020 Goldschlag et al.
2020/0183719 A1 6/2020 Shetty et al.
2020/0186416 A1 6/2020 Hashimoto et al.
2020/0244678 A1 7/2020 Shua
2020/0244692 A1 7/2020 Shua
2020/0259852 A1* 8/2020 Wolff et al. ............. H04L 67/10
2020/0320189 A1 10/2020 Zhang et al.
2020/0320845 A1 10/2020 Livny et al.
2020/0336489 A1* 10/2020 Wuest .................... G06F 21/45
2020/0364001 A1 11/2020 Bhandari et al.
2020/0382556 A1 12/2020 Woolward et al.
2020/0387357 A1 12/2020 Mathon et al.
2020/0389431 A1 12/2020 St. Pierre
2020/0389469 A1 12/2020 Litichever et al.
2020/0409741 A1 12/2020 Dornemann et al.
2021/0014265 A1 1/2021 Hadar et al.
2021/0026932 A1 1/2021 Boudreau et al.
2021/0034791 A1 2/2021 Singh et al.
2021/0042263 A1 2/2021 Zdornov et al.
2021/0056548 A1 2/2021 Monica et al.
2021/0089662 A1 3/2021 Muniswamy-Reddy et al.
2021/0105304 A1 4/2021 Kraning et al.
2021/0144517 A1 5/2021 Guim Bernat et al.
2021/0149788 A1 5/2021 Downie
2021/0158835 A1 5/2021 Hill et al.
2021/0168150 A1 6/2021 Ross et al.
2021/0173939 A1 6/2021 Kotler et al.
2021/0176123 A1 6/2021 Plamondon
2021/0176164 A1 6/2021 Kung et al.
2021/0185073 A1 6/2021 Ewaida et al.
2021/0194678 A1 6/2021 Schindewolf et al.
2021/0200881 A1 7/2021 Joshi et al.
2021/0203684 A1 7/2021 Maor et al.
2021/0203761 A1 7/2021 Ahn et al.
2021/0211453 A1 7/2021 Cooney
2021/0216591 A1 7/2021 Dvinov et al.
2021/0216630 A1 7/2021 Karr
2021/0218567 A1 7/2021 Richards et al.
2021/0226812 A1 7/2021 Park
2021/0226928 A1 7/2021 Crabtree et al.
2021/0232344 A1 7/2021 Corrie
2021/0234889 A1 7/2021 Burle et al.
2021/0243190 A1 8/2021 Bargury et al.
2021/0248443 A1 8/2021 Shu et al.
2021/0263802 A1 8/2021 Gottemukkula et al.
2021/0273953 A1 9/2021 Fellows et al.
2021/0297447 A1 9/2021 Crabtree et al.
2021/0306377 A1 9/2021 Kundu et al.
2021/0306416 A1 9/2021 Mukhopadhyay et al.
2021/0314342 A1 10/2021 Oberg
2021/0320794 A1 10/2021 Auh et al.
2021/0326883 A1 10/2021 Misra et al.
2021/0329019 A1 10/2021 Shua
2021/0334386 A1 10/2021 AlGhamdi et al.
2021/0357246 A1 11/2021 Kumar et al.
2021/0360032 A1 11/2021 Crabtree et al.
2021/0368045 A1 11/2021 Verma
2021/0377312 A1 12/2021 Biswas et al.
2021/0382995 A1 12/2021 Massiglia et al.
2021/0382997 A1 12/2021 Yi et al.
2021/0400071 A1 12/2021 Ray et al.
2021/0406365 A1 12/2021 Neil et al.
2021/0409486 A1 12/2021 Martinez
2022/0004410 A1 1/2022 Chen
2022/0012771 A1 1/2022 Gustafson
2022/0027180 A1 1/2022 Katyal et al.
2022/0030020 A1 1/2022 Huffman
2022/0035862 A1 2/2022 Ben-Natan
2022/0035905 A1 2/2022 Lu et al.
2022/0036302 A1 2/2022 Cella et al.
2022/0053011 A1 2/2022 Rao et al.
2022/0060497 A1 2/2022 Crabtree et al.
2022/0086173 A1 3/2022 Yavo et al.
2022/0100869 A1 3/2022 Berger et al.
2022/0103441 A1 3/2022 Noro
2022/0131844 A1 4/2022 Sherlock et al.
2022/0131888 A1 4/2022 Kanso
2022/0138512 A1 5/2022 Saillet et al.
2022/0156396 A1 5/2022 Bednash et al.
2022/0164111 A1 5/2022 Yang et al.
2022/0179809 A1 6/2022 Venkataramani et al.
2022/0179964 A1 6/2022 Qiao et al.
2022/0182403 A1 6/2022 Mistry
2022/0188273 A1 6/2022 Koorapati et al.
2022/0188689 A1 6/2022 Gunawardana et al.
2022/0197926 A1 6/2022 Passey et al.
2022/0210053 A1 6/2022 Du
2022/0215101 A1 7/2022 Rioux et al.
2022/0232024 A1 7/2022 Kapoor
2022/0232042 A1 7/2022 Crabtree et al.
2022/0247791 A1 8/2022 Duminuco et al.
2022/0253389 A1 8/2022 Fay et al.
2022/0263656 A1 8/2022 Moore
2022/0284362 A1 9/2022 Bellinger et al.
2022/0309166 A1 9/2022 Shenoy et al.
2022/0326861 A1 10/2022 Shachar et al.
2022/0326941 A1 10/2022 Nelson et al.
2022/0327119 A1 10/2022 Gasper et al.
2022/0335340 A1 10/2022 Moustafa et al.
2022/0342690 A1 10/2022 Shua
2022/0342985 A1 10/2022 Alperovich et al.
2022/0342997 A1 10/2022 Watanabe et al.
2022/0345480 A1 10/2022 Shua
2022/0345481 A1 10/2022 Shua
2022/0350931 A1 11/2022 Shua
2022/0357992 A1 11/2022 Karpovsky
2022/0358233 A1* 11/2022 Thakur ................... G06F 21/31
2022/0360958 A1 11/2022 Cui et al.
2022/0374519 A1 11/2022 Botelho et al.
2022/0382784 A1 12/2022 Osuala et al.
2022/0385668 A1 12/2022 Simonetti et al.
2022/0400128 A1* 12/2022 Kfir et al. .............. G06N 3/126
2022/0407841 A1 12/2022 Karpowicz
2022/0407889 A1 12/2022 Narigapalli et al.
2022/0413879 A1 12/2022 Passey et al.
2022/0414103 A1 12/2022 Upadhyay et al.
2022/0417011 A1 12/2022 Shua
2022/0417219 A1 12/2022 Sheriff
2023/0007014 A1 1/2023 Narayan
2023/0011957 A1 1/2023 Panse et al.
2023/0019015 A1 1/2023 Ahmed
2023/0027210 A1 1/2023 Shelton, IV et al.
2023/0032686 A1 2/2023 Williams et al.
2023/0036145 A1 2/2023 Ramachandran et al.
2023/0040635 A1 2/2023 Narayan

(56) References Cited

U.S. PATENT DOCUMENTS

| | | | |
|---|---|---|---|
| 2023/0043336 A1 | 2/2023 | Mitkar et al. | |
| 2023/0075355 A1 | 3/2023 | Twigg | |
| 2023/0087093 A1 | 3/2023 | Ithal et al. | |
| 2023/0095756 A1 | 3/2023 | Wilkinson et al. | |
| 2023/0102103 A1 | 3/2023 | Mazumder et al. | |
| 2023/0110080 A1 | 4/2023 | Hen | |
| 2023/0114821 A1 | 4/2023 | Thomas et al. | |
| 2023/0123477 A1* | 4/2023 | Luttwak et al. | H04L 63/20 |
| 2023/0125134 A1 | 4/2023 | Raleigh et al. | |
| 2023/0134674 A1 | 5/2023 | Quinn et al. | |
| 2023/0135240 A1 | 5/2023 | Cody et al. | |
| 2023/0136839 A1 | 5/2023 | Sundararajan et al. | |
| 2023/0155984 A1 | 5/2023 | Adam et al. | |
| 2023/0161614 A1 | 5/2023 | Herzberg et al. | |
| 2023/0161870 A1 | 5/2023 | Herzberg et al. | |
| 2023/0164148 A1 | 5/2023 | Narayan | |
| 2023/0164164 A1 | 5/2023 | Herzberg et al. | |
| 2023/0164182 A1 | 5/2023 | Kothari et al. | |
| 2023/0169165 A1 | 6/2023 | Williams et al. | |
| 2023/0171271 A1 | 6/2023 | Williams et al. | |
| 2023/0192418 A1 | 6/2023 | Horowitz et al. | |
| 2023/0208855 A1 | 6/2023 | Sheriff et al. | |
| 2023/0208870 A1 | 6/2023 | Yellapragada et al. | |
| 2023/0224319 A1 | 7/2023 | Isoyama et al. | |
| 2023/0229764 A1 | 7/2023 | Vohra et al. | |
| 2023/0231867 A1 | 7/2023 | Rampura Venkatachar | |
| 2023/0237068 A1 | 7/2023 | Sillifant et al. | |
| 2023/0254284 A1 | 8/2023 | McCord | |
| 2023/0254330 A1 | 8/2023 | Singh | |
| 2023/0297666 A1 | 9/2023 | Atamli et al. | |
| 2023/0325814 A1 | 10/2023 | Vijayan et al. | |
| 2023/0336550 A1 | 10/2023 | Lidgi et al. | |
| 2023/0336578 A1 | 10/2023 | Lidgi et al. | |
| 2023/0376586 A1 | 11/2023 | Shemesh et al. | |
| 2024/0007492 A1 | 1/2024 | Shen et al. | |
| 2024/0015184 A1 | 1/2024 | Vijayvargiya et al. | |
| 2024/0037229 A1 | 2/2024 | Pabón et al. | |
| 2024/0039927 A1 | 2/2024 | Narayan et al. | |
| 2024/0045838 A1 | 2/2024 | Reiss et al. | |
| 2024/0073115 A1 | 2/2024 | Chakraborty et al. | |
| 2024/0080329 A1 | 3/2024 | Reed et al. | |
| 2024/0080332 A1 | 3/2024 | Ganesh et al. | |
| 2024/0146818 A1 | 5/2024 | Cody et al. | |
| 2024/0179169 A1 | 5/2024 | Seveloff et al. | |
| 2024/0202359 A1 | 6/2024 | Shukla et al. | |
| 2024/0241752 A1 | 7/2024 | Crabtree et al. | |
| 2024/0259396 A1 | 8/2024 | Kerkar et al. | |
| 2024/0370880 A1 | 11/2024 | Jeske et al. | |
| 2024/0396894 A1 | 11/2024 | Fisher et al. | |
| 2025/0055870 A1 | 2/2025 | Viswambharan et al. | |
| 2025/0086280 A1 | 3/2025 | Murphy et al. | |
| 2025/0202898 A1 | 6/2025 | Lidgi et al. | |
| 2025/0328373 A1 | 10/2025 | Shua | |
| 2025/0363220 A1 | 11/2025 | Kotler et al. | |

FOREIGN PATENT DOCUMENTS

| | | | |
|---|---|---|---|
| CN | 112989379 | A | 6/2021 |
| EP | 4160983 | A1 | 4/2023 |
| EP | 4254869 | A2 | 10/2023 |
| JP | 2017120492 | A | 7/2017 |
| RU | 2421792 | C2 | 6/2011 |
| SG | 10202009702X | | 4/2021 |
| SG | 11202103226 | U | 4/2021 |
| WO | 2004034184 | A2 | 4/2004 |

OTHER PUBLICATIONS

Christie Koehler, Detecting and Managing Drift with Terraform, Jun. 7, 2018, https://www.hashicorp.com/en/blog/detecting-and-managing-drift-with-terraform (Year: 2018).

GitHub, Complete EC2 Instance, Aug. 27, 2021, https://github.com/terraform-aws-modules/terraform-aws-ec2-instance/tree/528613d4580f2c1266e87d8d24fc25bf5290fe2c/examples/complete (Year: 2021).

GitHub, Complete EC2 Instance, Aug. 27, 2021, https://github.com/terraform-aws-modules/terraform-aws-ec2-instance/tree/528613d4580f2c1266e87d8d24fc25bf5290fe2c/examples/complete/main.tf (Year: 2021).

Google, Shift security left with on-demand vulnerability scanning, Aug. 25, 2021 https://cloud.google.com/blog/products/ identity-security/scan-for-vulnerabilities-early-to-shift-security-left-in-cicd (Year: 2021).

Proxify, Mastering good programming practices: A comprehensive guide, Apr. 27, 2021, https://proxify.io/articles/good-programming-practices (Year: 2021).

Reddit, 1AM Roles for each Lambda?, Aug. 25, 2019 (Year: 2019).

Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.ieee.org/stamp/stamp.jsp?tp=&arnumber=8416506 (Year: 2018).

Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.ieee.org/stamp/ stamp.jsp?tp=&arnumber=9014355 (Year: 2019).

Safaryan, Olga A et al. Cryptographic Algorithm Implementation for Data Encryption in DBMS MS SQL Server. 2020 IEEE East-West Design & Test Symposium (EWDTS). https://ieeexplore.ieee.org/stamp/stamp.jsp?tp=&arnumber=9224775 (Year: 2020).

Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.ieee.org/stamp/ stamp.jsp?tp=&arnumber=9250645 (Year: 2020).

Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).

Leibenger, Dominik et al. EncFS goes multi-user: Adding access control to an encrypted file system. 2016 IEEE Conference on Communications and Network Security (CNS). https://ieeexoplore.ieee.org/stamp/stamp.jsp?tp=&arnumber=7860544 (Year: 2016).

Siqi Ma; Certified Copy? Understanding Security Risks of Wi-Fi Hotspot based Android Data Clone Services; ACM; Year: 2021; pp. 320-331.

Ali Gholami; Security and Privacy of Sensitive Data in Cloud Computing: A Survey of Recent Developments; ARIX:2016; pp. 131-150.

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).

Henry Hanping Feng; Anomaly Detection Using Call Stack Information; IEEE: Year:2003; pp. 1-14.

International Search Report for PCT Application No. PCT/IB2022/060940 dated Feb. 1, 2023. The International Bureau of WIPO.

International Search Report for PCT/IB2023/050848, dated May 9, 2023. International Bureau of WIPO.

International Search Report of PCT/IB2023/058074, dated Nov. 20, 2023. Searching Authority United States Patent and Trademark Office, Alexandria, Virginia.

International Search Report, PCT/IB23/55312. ISA/US, Commissioner for Patents, Alexandria, Virginia. Dated Aug. 30, 2023.

Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore. ieee.org/stamp/stamp.jsp?tp=&arnumber=9087010 (Year: 2020).

(56) References Cited

OTHER PUBLICATIONS

Microsoft Build. "Introduction to Azure managed disks". Aug. 21, 2023, https://docs.microsoft.com/en-us/azure/virtual-machines/managed-disks-overview.
Microsoft Docs. "Create a VM from a managed image". Article. Jan. 5, 2022. https://docs.microsoft.com/en-us/azure/virtual-machines/windows/create-vm-generalized-managed.
Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).
Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp.jsp?tp=&arnumber=9356962 (Year: 2020).
Written Opinion of the International Searching Authority for PCT Application No. PCT/IB2022/060940 dated Feb. 1, 2023. The International Bureau of WIPO.
Written Opinion of the International Searching Authority, PCT/IB23/55312. ISA/US Commissioner for Patents, Alexandria, Virginia. Dated Aug. 30, 2023.
Written Opinion of the Searching Authority for PCT/IB2023/050848, dated May 9, 2023. International Bureau of WIPO.
Written Opinion of the Searching Authority of PCT/IB2023/058074, dated Nov. 20, 2023. Searching Authority United States Patent and Trademark Office, Alexandria, Virginia.
Zhang et al. BMC Bioinformatics 2014. "On finding bicliques in bipartite graphs: a novel algorithm and its application to the integration of diverse biological data types". http://www.biomedcentral.com/1471-2105/15/110.
Sahil Suneja; Safe Inspection of Live Virtual Machines; IEEE; Year:2017; pp. 97-111.
Extended European Search Report for EP 23746586.9 dated Jul. 23, 2025. European Patent Office, Munich, Germany.
Bringhenti Daniele et al: "A novel approach for security function graph configuration and deployment", 2021 IEEE 7th International Conference on Network Softwarization (NetSoft), IEEE, Jun. 28, 2021 (Jun. 28, 2021), pp. 457-463, XP033948302, DOI: 10.1109/NETSOFT51509.2021.9492654 [retrieved on Jul. 20, 2021] * abstract * * Sections I-III *.
Espinha Gasiba Tiago Tiago Gasiba@Siemens Com et al: "Raising Security Awareness of Cloud Deployments using Infrastructure as\ Code through CyberSecurity Challenges", Proceedings of the 1st Conference on Mile-High Video, ACMPUB27, New York, NY, USA, Aug. 17, 2021 (Aug. 17, 2021), pp. 1-8, XP058860050, DOI: 10.1145/3465481.3470030 ISBN: 978-1-4503-9606-6 * abstract * * Sections 1-3 *.
Extended European Search Report and Opinion for EP 22898020.7, dated Sep. 9, 2025. European Patent Office, Munich, Germany.
European Search Report and Opinion for EP application 23811275.9, dated Sep. 25, 2025. European Patent Office, Munich, Germany.
Alomari, Mohammad Ahmed et al. A Study on Encryption Algorithms and Modes for Disk Encryption. 2009 International Conference on Signal Processing Systems. https://ieeexplore.ieee.org/stamp/stamp.jsp? tp=8&amumber=5166897 (Year: 2009).
Liang, Min; Chang, Chao-wen. Research and design of full disk encryption based on virtual machine. 2010 3rd International Conference on Computer Science and Information Technology. https://ieeexplore.ieee.org/stamp/stamp.jsp?tp=&amumber= 5565144 (Year: 2010).
Mrdovic, Sasa; Huseinovic, Alvin. Forensic analysis of encrypted vols. using hibernation file. 2011 19thTelecommunications Forum (TELFOR) Proceedings of Papers. https:/fieeexplore.ieee.org/stamp/stamp.jsp? tp=&arnumber=6143785 (Year: 2011).
Zhang, Lijun et al. The forensic analysis of encrypted Truecrypt vols. 2014 IEEE International Conference on Progress in Informatics and Computing. https:/fieeexplore.ieee.org/stamp/stamp.jsp?tp=8&arnumber=6972366 (Year: 2014).
"Layer 2—Data Link." OSI Explain, https://osiexplain.com/layer2_datalink.html. Accessed Jun. 3, 2026.
Calvin KO Execution Montioring of Security-Critical Programs in Distrubted Systems: A Specification-based Approach; IEEE: 1999; pp. 175-187.
Communication pursuant to Article 94(3) EPC for EP application No. 23746586.9, dated Jun. 11, 2026. European Patent Office, Munich, Germany.
Duc C. Le; Analyzing Data Granularity Levels for Insider Threat Detection Using Machine Learning; IEEE; 2021; pp. 30-44.
CopySnapshot Amazon Elastic Compute Cloud—Published Oct. 20, 2021 (Year: 2021).
Decrypt AWS Key Management Service Published Oct. 27, 2021 (Year: 2021).
How to share encrypted AMIs across account to launch encrypted EC2 instances Published May 13, 2019 (Year: 2019).

* cited by examiner

PERMISSION ESCALATION DETECTION UTILIZING UNIFIED IDENTITY MAPPING AND PERMISSION DETECTION

CROSS-REFERENCE TO RELATED APPLICATIONS

This application claims the benefit of U.S. Provisional Application No. 63/222,719 filed on Jul. 16, 2021, the contents of which are hereby incorporated by reference.

TECHNICAL FIELD

The present disclosure relates generally to cybersecurity threat detection, and specifically to detecting permission escalation of principals to determine cybersecurity threats.

BACKGROUND

Organizations are increasingly turning to hybrid and multi-cloud platform solutions. Such solutions utilize multiple public cloud computing environments, or combinations of private and public cloud computing environments. Cloud computing environments, such as Amazon® Web Services (AWS), Microsoft® Azure, Google® Cloud platform, and the like, may offer similar functionalities, but often have different implementations, even for similar technology stacks. For example, a container engine deployed in AWS is deployed differently than in Azure. However, each of these platforms may provide different benefits to an organization, which makes it worthwhile to maintain such structures.

A drawback of having a multi-cloud solution is that managing different cloud entities across multiple platforms has increased complexity, especially where the platforms do not offer a bridging solution. Managing access within a cloud computing environment, and between cloud computing environments is crucial for cybersecurity purposes, as mismanaged access can result in mistakes (e.g., a junior grade user shutting down a server) or active cybersecurity threats, such as data theft.

Cloud computing environments include cloud entities such as principals and resources. A principal is a cloud entity that may initiate actions in the cloud computing environment and act on resources. A principal may be a user account, for example. A resource is a cloud entity which provides access to computing resources such as storage, memory, processors, and the like, or services, such as web applications. In order to understand which of these cloud entities may access others, an administrator must check, for each cloud entity, whether it can access, or be accessed by, every other cloud entity.

For typical cloud computing environments, this can lead to a large and complicated calculation requiring large compute and memory resources to accomplish, and in most cases, it is not a feasible solution. Furthermore, this complication makes detecting a type of cybersecurity threat known as privilege escalation (or permission escalation) difficult. Privilege escalation is where an unauthorized user account gains access to rights, permissions, privileges, and the like in a cloud computing environment which it should not have.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting a permission escalation event. The method comprises querying a security graph to detect a second principal node, representing a second principal, the second principal having a permission to assume a first principal, represented by a first principal node, wherein the security graph stores a representation of a cloud computing environment in which the first principal and second principal are deployed; determining that the first principal node has access to a permission which is not accessible by the second principal node; and generating a permission escalation event.

Certain embodiments disclosed herein also include a non-transitory computer readable medium having stored thereon causing a processing circuitry to execute a process, the process comprising: querying a security graph to detect a second principal node, representing a second principal, the second principal having a permission to assume a first principal, represented by a first principal node, wherein the security graph stores a representation of a cloud computing environment in which the first principal and second principal are deployed; determining that the first principal node has access to a permission which is not accessible by the second principal node; and generating a permission escalation event.

Certain embodiments disclosed herein also include a system for detecting a permission escalation event. The system comprises: a processing circuitry; and a memory, the memory containing instructions that, when executed by the processing circuitry, configure the system to: query a security graph to detect a second principal node, representing a second principal, the second principal having a permission to assume a first principal, represented by a first principal node, wherein the security graph stores a representation of a cloud computing environment in which the first principal and second principal are deployed; determine that the first principal node has access to a permission which is not accessible by the second principal node; and generate a permission escalation event.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
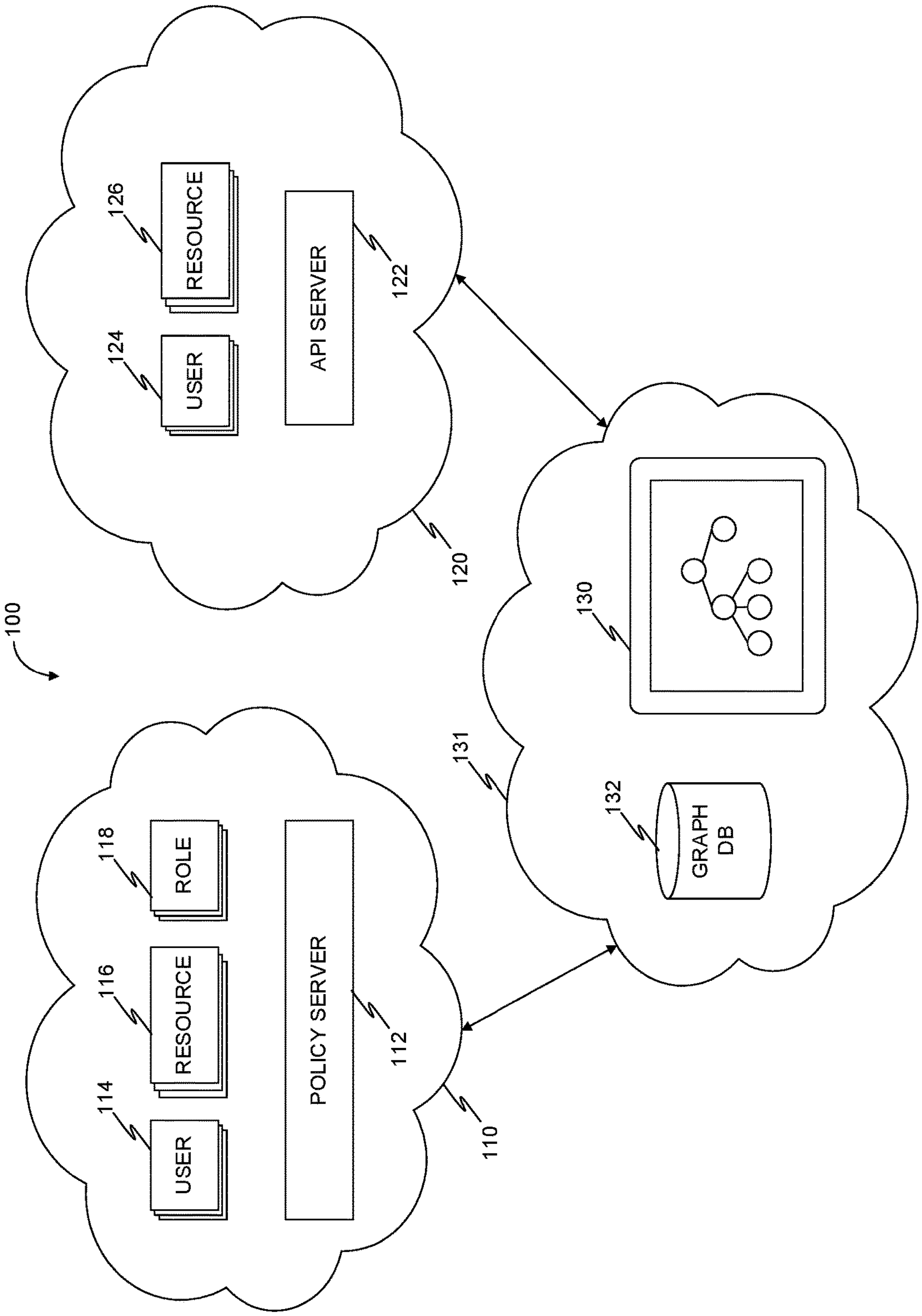
FIG. 1 is a schematic illustration of multiple cloud-based computing environments communicatively connected to a unifying identity mapper, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting permission misconfigurations by detecting effective permissions. Effective permissions are permissions which, for example, a principal has in practice. Effective permissions may or may not overlap with what permissions an administrator intends a principal to have. For example, a principal may have more permissions (i.e., higher permissions), than what an administrator intended to have. The system performs identity mapping for detecting the effective permissions, whereby principals and resources of a cloud computing environment, or of different cloud computing environments, are mapped into a security graph using a unified model. The unified model includes a principal data structure for defining a principal, and a resource data structure which defines a resource. Thus, principals from different cloud environments, for example, are defined using a principal data structure, which allows standardizing how a principal is defined. Principals and resources are cloud entities. A principal is a cloud entity which has permission to act on a resource, for example by initiating actions in or on the cloud computing environment. A principal may be, for example, a user account, a service account, a role, and the like. A resource is a cloud entity which provides access to hardware, such as processing, storage, memory, and the like, or provides access to a service, a virtualization, and the like. A resource may be, for example, a virtual machine, a container, a serverless function, a web application firewall, an application programming interface (API) gateway, a load balancer, a bucket, and the like.

Mapping principals to the security graph further includes detecting permissions accessed from the cloud environment. For example, an API of a cloud computing environment may be queried to determine security policies, permissions, rules, and the like which apply to principals, resources, and a combination thereof. Principals and resources are represented (i.e., mapped) in the security graph by nodes, each node generated based on the corresponding data structure. A permission may be represented in the security graph by an edge, such that an edge connecting a principal node (i.e., a node representing a principal) to a resource node (i.e., a node representing a resource) indicates a certain permission, whereby the principal has a permission with respect to the resource.

Traversing the security graph allows detection of cybersecurity threats, for example by detecting permission escalation potential between two or more principal nodes, detecting effective permissions of a principal, and the like. However, determining permissions for each principal on each resource is a processing intensive procedure. Therefore, in order to decrease complexity of the security graph, various optimizations, such as utilizing maximal biclique, are implemented when generating connections (i.e., representing permissions) in the graph between principals and resources. This allows to decrease memory usage and processing resources, resulting in a system with increased security utilizing less resources than the prior art.

It is noted in this regard that determining effective permissions is something a human can do. However, it is recognized that cloud computing environments contain many relationships between principals and resources, often exceeding thousands in number. Even where a human could conceivably determine what the effective permissions are for each principal acting on each resource, no human can compute this fast enough to be actionable in the context of a cybersecurity threat. Furthermore, these relationships constantly change as administrators are changing the environments, resources, such as containers, are spun up and spun down, all of which result in effective permissions being constantly subject to change.

Additionally, certain advantages disclosed herein, such as utilizing maximal bicliques, improve the operation of a computer system determining effective permissions, and as such cannot be performed by a human.

FIG. 1 is an example of a schematic illustration 100 of multiple cloud computing environments communicatively connected to a unifying identity mapper, implemented in accordance with an embodiment. A cloud computing environment may be, for example, Amazon® Web Services (AWS), Microsoft® Azure, Google® Cloud Platform (GCP), and the like. Cloud computing environments may each operate with one or more standards (i.e., models), and achieve similar or different functionality in different or similar manners. An organization of users may use a first type of cloud environment for a first purpose, where it is advantageous, and a second type of cloud environment for a second purpose, where the second environment is likewise advantageous. For example, an organization may simultaneously utilize AWS for providing a first type of service, and GCP for providing a second type of service However, utilizing different cloud environments may lead to complicated security policies, which in turn can present vulnerabilities for an organization. In order to at least minimize these, it would be beneficial to have a single normalized (i.e., unified) model for all cloud computing environments, in order to more easily understand where potential threats and risks are.

Generally, every cloud environment includes principals, which act on resources. A principal may be a user account, service account, role, and the like, while a resource may be a virtual machine, container, serverless function, and the like. Each cloud computing environment may include different definitions and data structures for what constitutes a principal or a resource. For example, in some cloud environments code may execute as a user account rather than a service account, while in others code can only execute as a service account.

A first cloud computing environment 110 includes a plurality of user accounts 114, a plurality of resources 116, and a plurality of roles 118. A role 118 is a set of one or more permissions which may be associated with one or more user accounts 114. A user account 114 may be associated with a plurality of roles. The cloud computing environment 110 further includes a policy server 112, which includes one or more policies, each policy including one or more permissions which allow a user account 114, a role 118 or both, access to a resource 116. A policy may be implemented, for example, as a JSON file including therein text which indicates what certain permissions are. A policy may include wildcards, allowing, for example, every user account having an email address at a first domain access to a first resource, and user accounts having an email address at a second domain access to the first resource and to a second resource.

A second cloud computing environment 120 includes a plurality of user accounts 124, a plurality of resources 126, and an API server 122. The API server 122 may provide upon request data including user accounts, applications, resources, and relationships (i.e., permissions) between them.

Each of the cloud computing environments 110 and 120 are communicatively connected to a unifying identity mapper 130. In an embodiment, the unifying identity mapper 130 may be implemented in a security environment 131. The security environment 131 may be implemented as a cloud computing environment, such as Azure. The security environment 131 further includes a graph database 132, on which a security graph may be stored. A security graph is configured to represent a plurality of cloud computing environments. For example, the unifying identity mapper 130 may store identities as nodes in the security graph, where a node represents an identity. An identity may be, for example, a unique user account, unique service account, and the like.

In an embodiment, the first cloud computing environment 110 and the second cloud computing environment 120 may be the same type of cloud environment, or different types of cloud environments. For example, a first cloud computing environment may be deployed in AWS, while the second cloud computing environment is deployed in Azure. As another example, the first and second cloud computing environments 110 and 120 may be both deployed in AWS, as separate environments under the same cloud computing architecture. For example, each cloud computing environment may be deployed as a virtual private cloud (VPC) in AWS.

In some embodiments, the unifying identity mapper 130 (also referred to as mapper 130) may be implemented in the first cloud computing environment 110, the second cloud computing environment 120, or a different networked or cloud computing environment. The mapper 130 is configured to receive from each cloud computing environment data pertaining to principals, user accounts, service accounts, resources, roles, policies, permissions, and the like.

Receiving such data may be different based on the cloud environment architecture. For example, Google® Cloud Platform provides such information by accessing an API. In an embodiment the mapper 130 is configured to call the API with a request to receive the data. As another example, AWS utilizes policies which may be requested as JSON files. In an embodiment the mapper 130 is configured to read data from the JSON file. The mapper 130 is further configured to map the received data into a security graph. Mapping the received data may include generating nodes in the security graph representing principals, and resources, and connecting the nodes (i.e., generating edges) based on permissions which are read from the received data. This is discussed in more detail in FIG. 3 herein. In an embodiment, the mapper 130 may be deployed on a physical or virtual machine. When deployed on a virtual machine (or other virtualization) a computing architecture may serve as underlying hardware. An embodiment of a mapper 130 is discussed in more detail in FIG. 7 below.

Figure 2A:
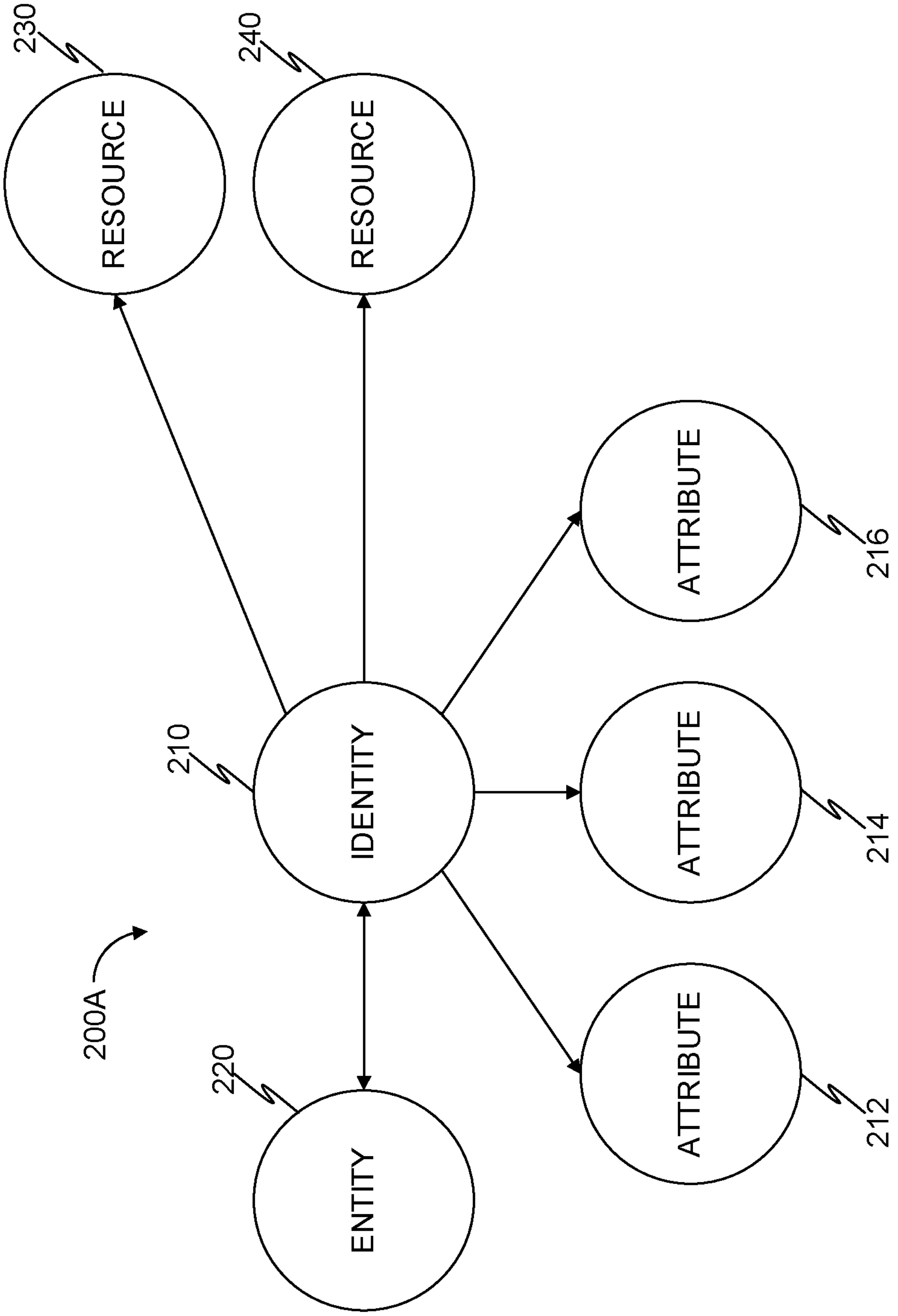
FIG. 2A is a portion of a unified graph model generated by a unifying identity mapper, and implemented in accordance with an embodiment.

FIG. 2A is an example of a portion of a security graph 200A generated by a unifying identity mapper, implemented in accordance with an embodiment. An identity is a unique identifier of, for example, a principal. The principal acts on resources, such as a first resource, represented by first resource node 230 and a second resource, represented by second resource node 240. An identity node 210 represents an identity, such as a username, and may be associated with an entity node 220. The entity node 220 may be a person, organization, and so on. For example, the entity may be an individual named "John Smith", and the identity may be a username "john.smith@example.com".

Each identity 210 may be connected to a plurality of attributes, such as a first attribute 212, a second attribute 214, and third attribute 216. While three attributes are used in this example, it is readily understood that any number of attributes may define an identity node, and that each identity node may be defined by one or more attributes. An attribute may be metadata. For example, a role identifier (e.g., "admin") may be an attribute of an identity node (e.g., indicating an identity is an administrator).

Figure 2B:
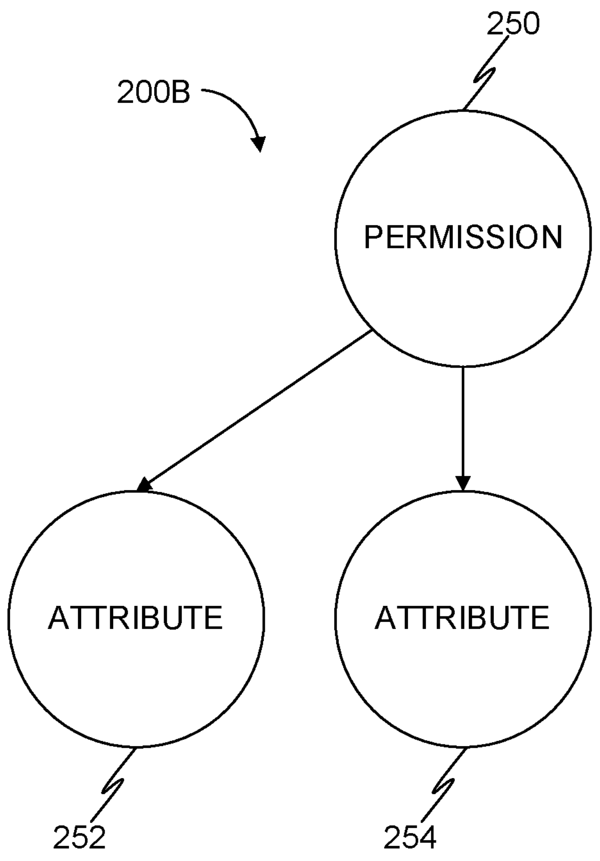
FIG. 2B is another portion of a unified graph model generated by a unifying identity mapper, and implemented in accordance with an embodiment.

FIG. 2B is an example of another portion of a security graph 200B generated by a unifying identity mapper, implemented in accordance with an embodiment. A permission node 250, representing a permission, is connected with a first attribute node 252, and a second attribute node 254. While two attributes are used in this example, it is readily understood that any number of attributes may define a permission node 250, and that each permission node may be defined by one or more attributes. An attribute of a permission node 250 may indicate different permission types, such as reading, writing, or erasing files, agents, administrator or root roles, and the like. A permission node 250 may be connected to an identity node, such as the identity node 210 of FIG. 2A. In other embodiments, a permission may be stored in the security graph as an edge. For example, a principal node connected with an edge to a resource node, wherein the edge indicates the permission the principal node carries with respect to the resource node.

Figure 3:
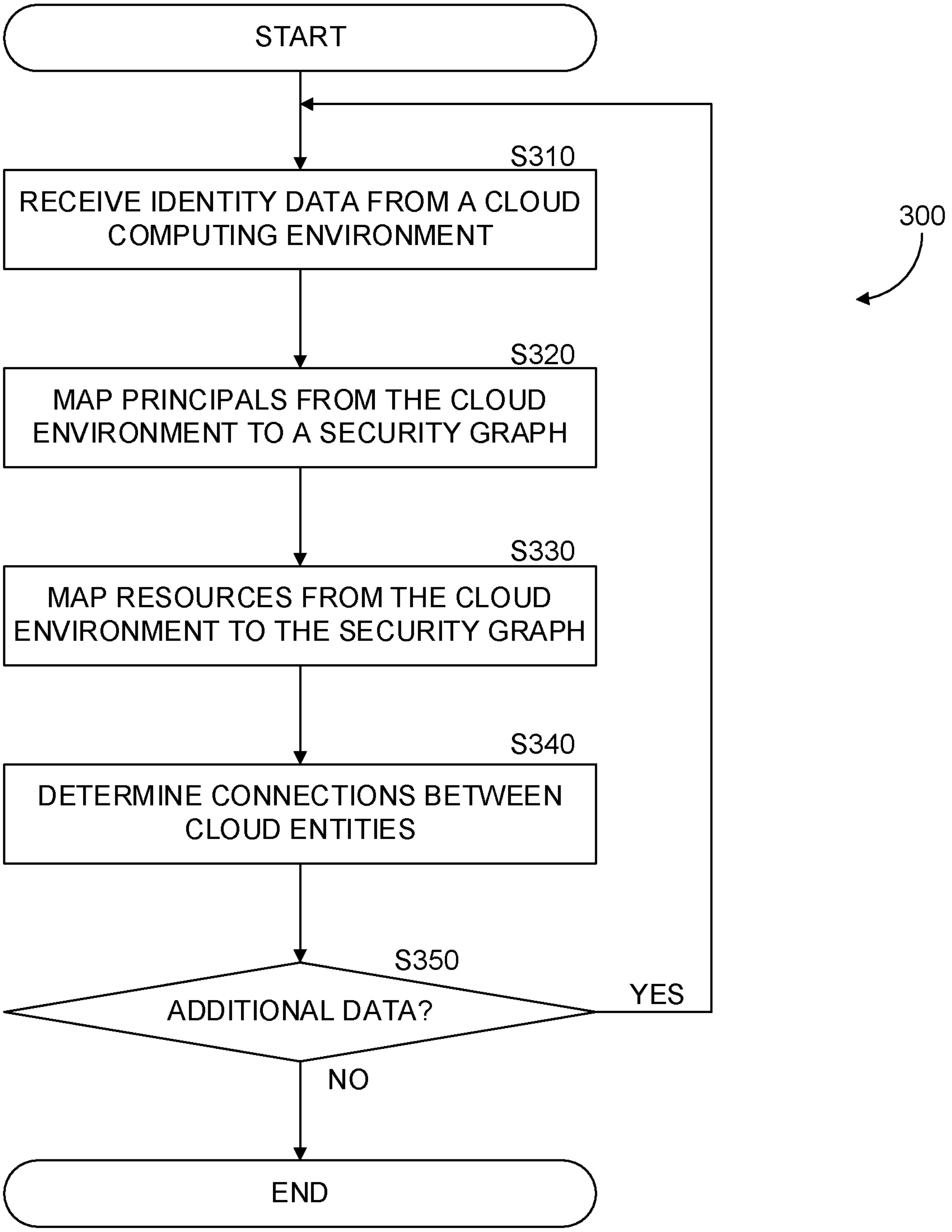
FIG. 3 is a flowchart of a method for mapping principals and resources from a first computing environment utilizing a unified identity mapper, implemented in accordance with an embodiment.

FIG. 3 is an example flowchart 300 of a method for mapping principals and resources from a cloud computing environment into a security graph utilizing a unified identity mapper, implemented in accordance with an embodiment.

At S310, identity data is received from a cloud computing environment. Identity data may include information relating to principals, resources, and connections between principals and resources. For example, information may be identifiers, such as username, account name, role identifier, service account identifier, network address, IP address, and the like. Connections between principals and resources may be defined by policies, permissions, and the like. For example, a policy may indicate that a user account associated with a certain predefined role may access a first plurality of resources in a cloud computing environment.

At S320, a plurality of principals from the cloud computing environment are each mapped to a corresponding principal node of a security graph. In an embodiment mapping includes generating the principal node and associating it with the principal. Associating a principal with a principal node may include, for example, storing a unique identifier of the principal on the principal node. A principal node may be, for example, an identity node. For example, a user account is a principal, and the user account is mapped to a principal node representing the user account. The security graph may further store metadata associated with the user account, such as a username.

At S330 a plurality of resources from the cloud computing environment are each mapped to a corresponding resource node of the security graph. In an embodiment, mapping is performed by generating a resource node and associating it with the resource. Associating may be performed by storing a unique identifier of the resource on the resource node. A resource node may be, for example, a node representing a virtual machine, a container, a serverless function, a software application, an operating system, a WAF, a gateway, a load balancer, and the like.

In an embodiment, a generated resource node, and a generated principal node, may each store information, for example as data attributes, which points to a corresponding identity, resource, and the like, to which they are mapped, enabling a trace between the representation (e.g., principal node) and the represented object (specific username). In some embodiments, an object (i.e., cloud entity) in a cloud computing environment may be a principal, and also a resource to other principals. For example, a load balancer may be a resource for a user account, but a principal for a web server which utilizes the load balancer. The security graph may further store metadata for a resource node, such as IP address, name in a namespace, etc.

At S340 a connection is determined between a first cloud entity and a second cloud entity in the cloud computing environment. The first cloud entity and the second cloud entity each may be a principal, or a resource. In an embodiment, determining a connection includes reading a policy, a permission, and the like, and determining a relationship between a first cloud entity and a second cloud entity, wherein the cloud entities form a condition of the policy, permission, and the like. In an embodiment, a cloud entity may be a role, and associated with a role node, implemented as a type of principal node. A role node is associated with a specific role (i.e., set of one or more permissions relating to a resource). Determining a connection may include reading data from a policy in order to determine if a permission exists to allow communication between the principal node and another principal node or a resource node. In an embodiment, a determined connection is stored as an edge in the security graph. For example, a connection indicating that a principal can access a resource may be stored as a principal node connected by an edge to a resource node, wherein the edge indicates a "can access" type connection.

At S350 a check is performed if additional data is received. If yes, execution continues at S310. Otherwise, execution may terminate. In some embodiments, a check may be performed to determine if additional principals need to be mapped. If yes, execution continues at S320. In yet other embodiments, a check may be performed to determine if additional resources need to be mapped. If yes, execution may continue at S330.

Figure 4:
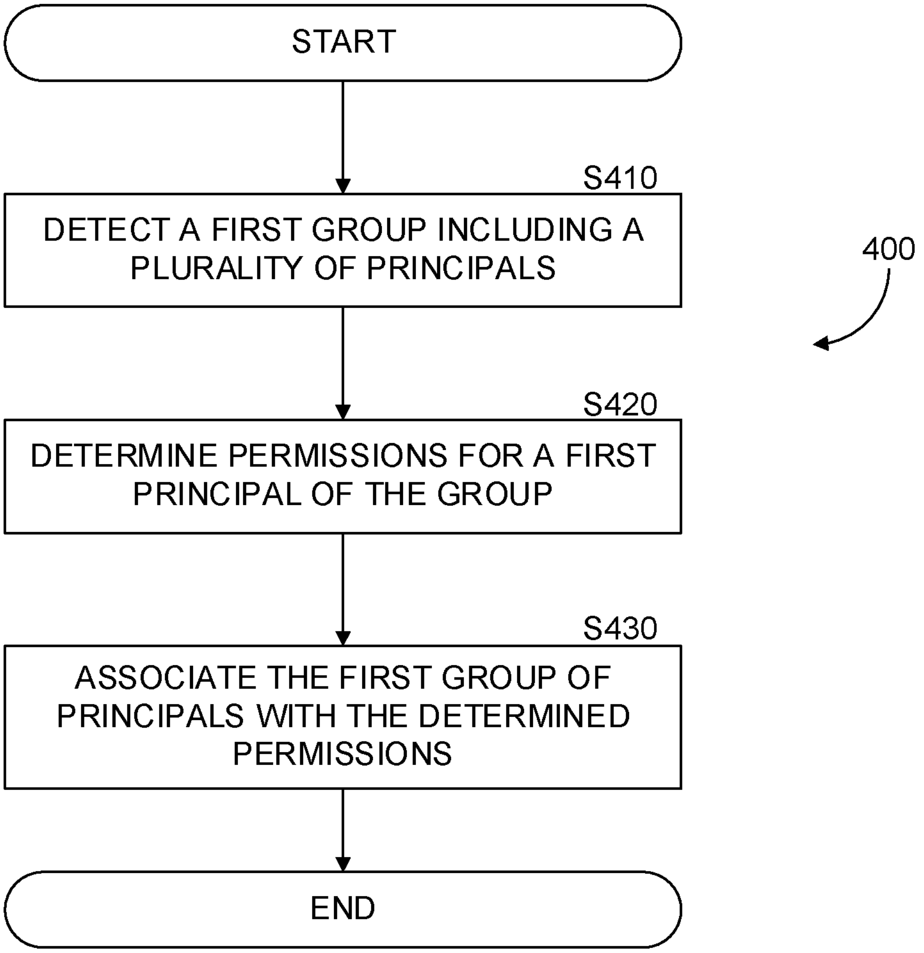
FIG. 4 is a flowchart of a method for determining effective permissions of a principal in a cloud-based computing environment, implemented in accordance with an embodiment.

FIG. 4 is an example flowchart 400 of a method for determining effective permissions of a principal in a cloud computing environment, implemented in accordance with an embodiment. Determining effective permissions is advantageous from a cybersecurity perspective as it allows to realistically understand where potential security threats may arise. For example, assuming a certain user has limited permissions, only to discover that the user has permissions which exceed those limitations, is a typical scenario in cybersecurity incidents.

In order to determine effective permissions, permissions need to be determined for each principal on each resource, e.g., determining if each principal can access each resource. Performing such a calculation is processing intensive, as well as requiring large amounts of memory due to the volume of both principals and resources in a cloud computing environment. This complication is compounded when also taking into account that certain service accounts may assume other service accounts (for example across different cloud platforms), certain user accounts may assume other user accounts, and certain resources may also be principals. The disclosed embodiments reduce the burden of processing and memory usage, for example by reducing the amount of checks performed for each principal-resource combination, while still maintaining complete information on effective permissions.

At S410, a group of a plurality of principals is detected in a security graph. The security graph, as detailed above, represents a cloud computing environment of which principals and resources are represented as nodes in the security graph. Detecting a group of principals may be performed, for example, by utilizing vertex maximal bicliques. A biclique is maximal when it is the largest size, based on number of nodes (vertex maximum biclique) or number of edges (edge maximum biclique). A biclique is a bipartite graph where every node of the first set (principals) is connected to every node of the second set (resources). Each principal in the group has the same permissions to act on each of the resources. By only determining in the next steps permissions for one principal as a representative of the group, redundant determinations are not performed, thereby decreasing processing and memory requirements.

At S420, permissions are determined for a first principal of the group with respect to a resource. In an embodiment, permissions may be associated with a resource, a plurality of resources, and the like. A permission may be an access policy, an access rule, and the like. Permissions may include a permission set, which is a group of permissions which together define access to a particular resource, group of resources, action, actions, and the like. For example, a first permission set (i.e., role) may be associated with a first resource, a second permission set may be associated with a second resource, and so on.

At S430 the first group of principals is associated with the determined permissions. In an embodiment, associating a group of principals with the determined permissions includes generating a node representing the effective permissions in the security graph. An edge is generated between each of the principal nodes representing the first group of principals, to the node representing the effective permissions. By associating all the principals based on determining permissions for a single principal, many redundant calculations are not performed, thereby reducing compute and memory resources required for computing and storing the redundant information. In other embodiments, a principal group node may be generated, to represent the first group of principals. The principal group node may be associated with the permission, for example by connecting the principal group node to the resource node with an edge representing the permission. Each of the principal nodes may be in turn connected to the principal group node.

Figure 5:
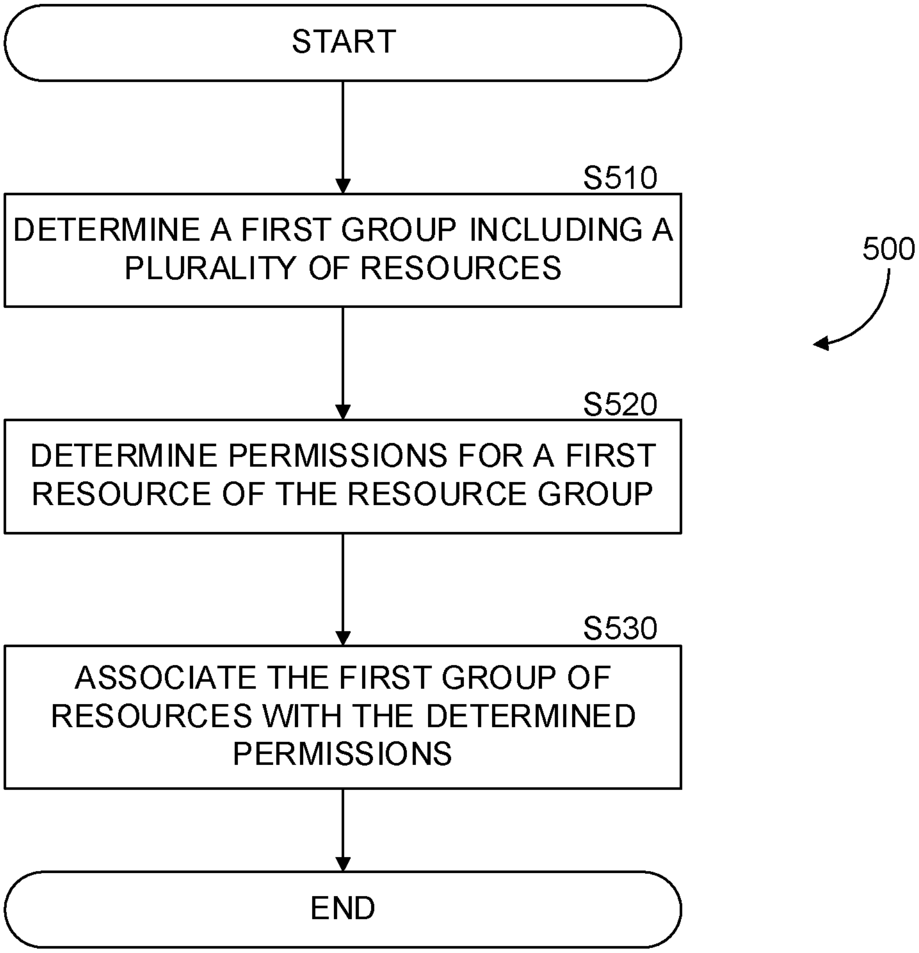
FIG. 5 is a flowchart of a method for determining effective permissions of a resource in a cloud-based computing environment, implemented in accordance with an embodiment.

FIG. 5 is an example flowchart 500 of a method for determining effective permissions of a resource in a cloud environment, implemented in accordance with an embodiment. Determining effective permissions is advantageous from a security perspective as it allows to realistically understand where potential security threats may arise. For example, assuming a certain resource may be supposed to have limited permissions, however, the resource can assume a role which would allow the resource additional permissions which were not intended.

In order to determine effective permissions, permissions need to be determined for each resource on each other resource, e.g., determining if each resource can access each other resource. Performing such a calculation is processing intensive, as well as requiring large amounts of memory due to the volume of both principals and resources in a cloud computing environment. This complication is compounded when also taking into account that certain service accounts may assume other service accounts (for example across different cloud platforms), certain user accounts may assume other user accounts, and certain resources may also be principals. The disclosed embodiments reduce the burden of processing and memory usage, for example by reducing the amount of checks performed for each principal-resource combination, while still maintaining complete information on effective permissions.

At 510 a first group of a plurality of resources is detected in a security graph. The security graph, as detailed above, represents a cloud computing environment of which principals and resources are represented as nodes in the security graph. Detecting a group of resources may be performed, for example, by utilizing vertex maximal bicliques. A biclique is maximal when it is the largest size, based on number of nodes (vertex maximum biclique) or number of edges (edge maximum biclique). A biclique is a bipartite graph where every node of the first set (resources) is connected to every node of the second set (other resources). Each resource in the group has the same permissions to act on each of the other resources. By only determining in the next steps permissions for one resource as a representative of the group, redundant determinations are not performed, thereby decreasing processing and memory requirements.

At S520 permissions are determined for a first resource of the first group. The permissions may be associated with one or more resources or principals. For example, a first permission set (i.e., role) may be associated with a first resource, a second permission set may be associated with a second resource, etc. A permission may be, for example, permission to read data from a storage, and permission to write data to the storage.

For example, a first group may have permission to read from the storage, while a second group may have permissions to read and write to the storage. As another example, a serverless function may have permission to write to a storage of a distributed storage system, which includes multiple storage devices. As the multiple storage devices share a common policy, the serverless function has permission to write to any of the multiple storage devices. By grouping the storage devices (i.e., utilizing maximal bicliques), less memory is required to indicate that the serverless function has permission to write to any of the multiple storage devices.

At 530 the first group of resources is associated with the determined permissions. In an embodiment, associating a group of resources with the determined permissions includes generating a node representing the effective permissions in the security graph. An edge is generated between each of the resource nodes representing the first group of resources, to the node representing the effective permissions. By associating all the resources based on determining permissions for a single resource, many redundant calculations are not performed, thereby reducing compute and memory resources required for storing the redundant information.

Figure 6:
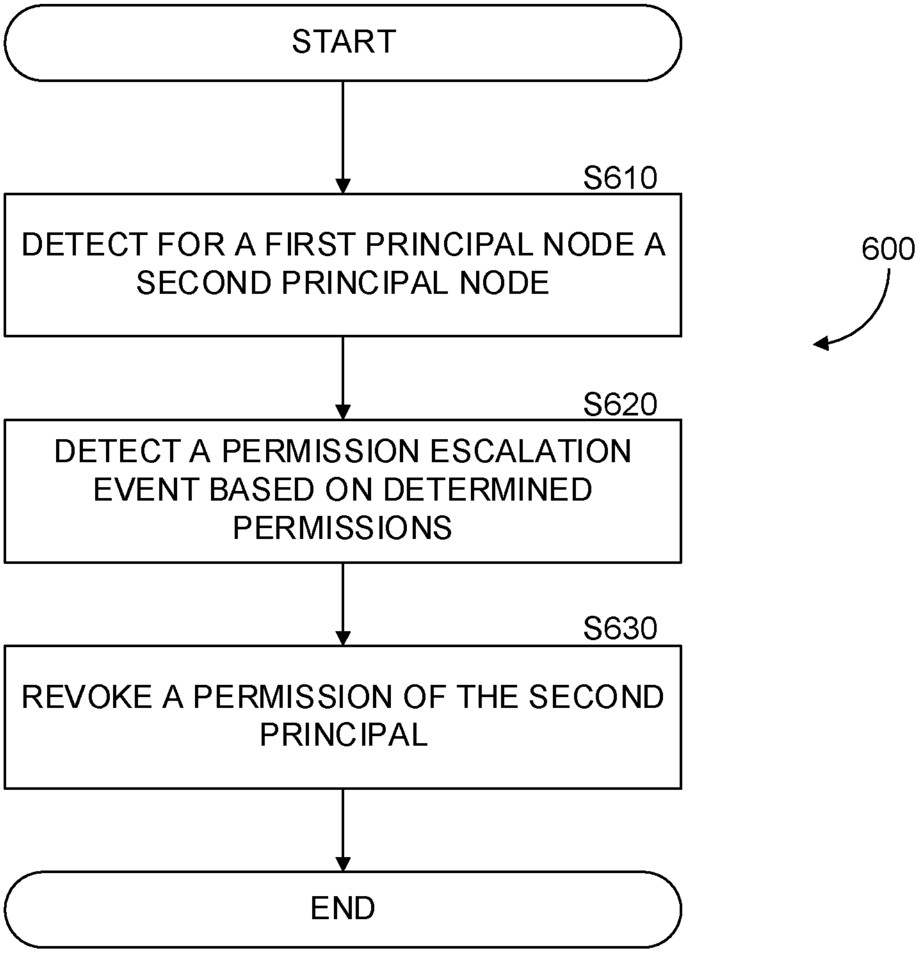
FIG. 6 is a flowchart of a method for detecting permission escalation utilizing a unified identity model, implemented in accordance with an embodiment.

FIG. 6 is an example flowchart 600 of a method for detecting permission escalation utilizing a unified identity model on a security graph, implemented in accordance with an embodiment. Permission escalation is a type of cybersecurity risk where a principal (e.g., a user account) has access to resources which they are not intended to have, by gaining a permission they did not previously possess and are not supposed to possess. A vertical escalation occurs when a principal is able to access resources which are only accessible to principals having higher access. A horizontal escalation occurs when a principal has access to resources of another similar principal (e.g., user Alice is able to access emails of user Bob).

At S610 a second principal node is detected for a first principal node in a security graph. The second principal (represented by the second principal node) is able to assume the first principal (represented by the first principal node), i.e., the second principal may act as the first principal, in some, or all aspects. Permissions of a principal may change when acting through (i.e., assuming) another principal. For example, an application may have permission to perform a wide variety of operations in a cloud computing environment. However, a user account operating the application may only access limited permissions of all the permissions available to the application.

In an embodiment, detecting the second principal node may be performed by querying the security graph to detect principal nodes which are connected to the first principal node.

At S620, a permission escalation event is detected based on determined permissions of the first principal node and the second principal node. In an embodiment, detecting a permission escalation event may occur when an access occurs which involves a principal which is not authorized for the access. For example, the second principal is not authorized to access a resource which the first principal is authorized to access. When the second principal is allowed to assume the first principal, the second principal has an effective permission to access the first resource, which should not be permitted.

As another example, the second principal may assume a role of the first principal node, and as the first principal node grant additional permissions to the second principal which were not previously available. The additional permissions are stored on the security graph and can be detected, for example by querying the security graph to detect permissions granted by a first principal to a second principal, where the second principal can assume a role of the first principal.

This detection is possible by tracing the connection between the access and the principal utilizing the security graph described above.

At S630, a permission associated with the second principal is revoked. Revoking a permission is performed in an attempt to prevent the escalation event. In another embodiment, a notification may be generated to an administrator account to notify that a potential permission escalation may occur.

In certain embodiments, a permission may be determined to be a dangerous permission. For example, root level access, permission to perform data deletion, non-recoverable operations, and the like, may all be considered dangerous permissions. If not operated correctly, by an authorized administrator user, usage of such permissions may cause irreparable damage to a cloud computing environment. In such embodiments a dangerous permission event may be generated, to indicate to a human operator that such an event was detected.

In some embodiments, the second principal may be publicly accessible, meaning that it can be accessed by, or through, a public network, which is not the cloud computing environment. The cloud computing environment is a secure computing environment, even when deployed on a public cloud (e.g., on AWS). For example, the cloud computing environment may be deployed as a virtual private cloud (VPC) with limited external access on AWS infrastructure.

Occasionally second principals may be publicly accessible on purpose, for example to allow vendors limited access (in terms of permission, time, or both) to the cloud computing environment. However, if such a second principal can assume a first principal, then this is a potential cybersecurity vulnerability, as an attacker may take advantage of this to gain access to the cloud computing environment.

Therefore, when a second principal which can assume a first principal is also publicly accessible, an alert level (or severity) corresponding to the generated permission escalation event may be adjusted to a higher level to indicate a higher level of severity.

In other embodiments, an instruction may be generated which when executed configures an access system to revoke a permission from the first principal, from the second principal, or from both. An access system may be, for example, an identity and access management (IAM) system.

Figure 7:
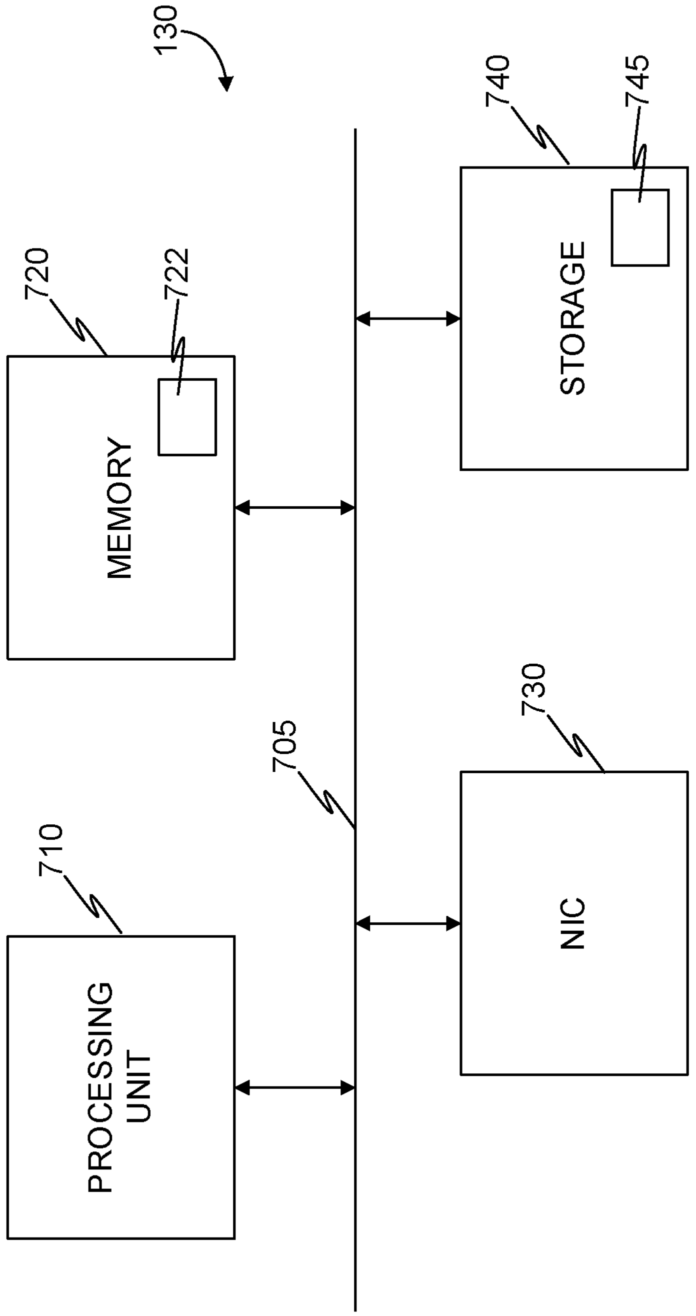
FIG. 7 is a schematic illustration of a mapper, implemented according to an embodiment.

FIG. 7 is an example of a schematic illustration of a mapper 130 implemented according to an embodiment. The mapper may be a physical or virtual machine. The mapper 130 includes at least one processing element 710, for example, a central processing unit (CPU). In an embodiment, the processing element 710 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing element 710 is coupled via a bus 705 to a memory 720. The memory 720 may include a memory portion 722 that contains instructions that when executed by the processing element 710 performs the method described in more detail herein. The memory 720 may be further used as a working scratch pad for the processing element 710, a temporary storage, and others, as the case may be. The memory 720 may be a volatile memory such as, but not limited to random access memory (RAM), or non-volatile memory (NVM), such as, but not limited to, Flash memory.

The processing element 710 may be coupled to a network interface controller (NIC) 730, which provides connectivity to one or more cloud computing environments, via a network.

The processing element 710 may be further coupled with a storage 740. Storage 740 may be used for the purpose of holding a copy of the method executed in accordance with the disclosed technique. The storage 740 may include a storage portion 745 containing a security graph model (i.e., a data structure for a principal, and a data structure for a resource) into which principals and resources of a cloud environment are mapped to corresponding nodes, and connections between the nodes are determined based on data received from the cloud environment indicating permissions of each principal to act on one or more resources.

The processing element 710 and/or the memory 720 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting a permission escalation event, comprising:

detecting that a second principal node, representing a second principal, has a permission to assume a first principal, represented by a first principal node, wherein the first principal node and the second principal node are each nodes of a security graph that is a representation of a combination of a first cloud computing environment and at least a second cloud computing environment, the security graph using a unified model so that each principal of the first cloud computing environment and each principal of the second cloud computing environment are represented in the security graph in a standardized way, the first principal being deployed in one of the first cloud computing environment and the second cloud computing environment and second principal being deployed in one of the first cloud computing environment and the second cloud computing environment, the detecting being performed by querying the security graph to detect principal nodes that are connected to the first principal node;

determining that another permission is a dangerous permission;

determining that the first principal node has access to the another permission which is not accessible by the second principal node;

generating a dangerous permission event, in response to determining that the first principal node is associated with the dangerous permission; and generating a permission escalation event alert.

2. The method of claim 1, further comprising:

generating the permission escalation event alert in response to determining that the second principal node is associated with a permission granted by the first principal node.

3. The method of claim 1, wherein the permission is for a resource.

4. The method of claim 1, wherein the first principal node is any one of: a user account, a service account, and a role.

5. The method of claim 1, further comprising:

querying the security graph to detect a third principal node, representing a third principal, the third principal having a permission to assume the first principal, wherein the third principal is deployed in a cloud computing environment different from the cloud computing environment in which the first principal is deployed.

6. The method of claim 5, wherein the first cloud computing environment is of a first type, and the second cloud computing environment is of a second type which is not the first type.

7. The method of claim 1, further comprising:

determining that the second principal is publicly accessible; and adjusting the permission escalation event alert to a higher status based on the determined public access.

8. The method of claim 1, further comprising:

revoking at least one permission associated with the first principal node or the second principal node, upon detection of the permission escalation event.

9. A non-transitory computer readable medium having stored thereon instructions for causing a processing circuitry to execute a process for detecting a permission escalation event, the process comprising:

detecting that a second principal node, representing a second principal, has a permission to assume a first principal, represented by a first principal node, wherein the first principal node and the second principal node are each nodes of a security graph that is a representation of a combination of a first cloud computing environment and at least a second cloud computing environment, the security graph using a unified model so that each principal of the first cloud computing environment and each principal of the second cloud computing environment are represented in the security graph in a standardized way, the first principal being deployed in one of the first cloud computing environment and the second cloud computing environment and second principal being deployed in one of the first cloud computing environment and the second cloud computing environment, the detecting being performed by querying the security graph to detect principal nodes that are connected to the first principal node;

determining that another permission is a dangerous permission;

determining that the first principal node has access to the another permission which is not accessible by the second principal node;

generating a dangerous permission event, in response to determining that the first principal node is associated with the dangerous permission; and generating a permission escalation event alert.

10. A system for detecting a permission escalation event, comprising:

a processing circuitry; and a memory, the memory containing instructions that, when executed by the processing circuitry, configure the system to:

detect that a second principal node, representing a second principal, has a permission to assume a first principal, represented by a first principal node, wherein the first principal node and the second principal node are each nodes of a security graph that is a representation of a combination of a first cloud computing environment and at least a second cloud computing environment, the security graph using a unified model so that each principal of the first cloud computing environment and each principal of the second cloud computing environment are represented in the security graph in a standardized way, the first principal being deployed in one of the first cloud computing environment and the second cloud computing environment and second principal being deployed in one of the first cloud computing environment and the second cloud computing environment, the detecting being performed by querying the security graph to detect principal nodes that are connected to the first principal node;

determine that another permission is a dangerous permission;

determine that the first principal node has access to the another permission which is not accessible by the second principal node;

generate a dangerous permission event, in response to determining that the first principal node is associated with the dangerous permission; and generate a permission escalation event alert.

11. The system of claim 10, wherein the memory contains further instructions, which when executed by the processing circuitry further configure the system to:

generate the permission escalation event alert in response to determining that the second principal node is associated with a permission granted by the first principal node.

12. The system of claim 10, wherein the permission is for a resource.

13. The system of claim 10, wherein the first principal node is any one of: a user account, a service account, and a role.

14. The system of claim 10, wherein the memory contains further instructions, which when executed by the processing circuitry further configure the system to:

query the security graph to detect a third principal node, representing a third principal, the third principal having a permission to assume the first principal, wherein the third principal is deployed in a cloud computing environment different from the cloud computing environment in which the first principal is deployed.

15. The system of claim 14, wherein the first cloud computing environment is of a first type, and the second cloud computing environment is of a second type which is not the first type.

16. The system of claim 10, wherein the memory contains further instructions, which when executed by the processing circuitry further configure the system to:

determine that the second principal is publicly accessible; and adjust the permission escalation event alert to a higher status based on the determined public access.

17. The system of claim 10, wherein the memory contains further instructions, which when executed by the processing circuitry further configure the system to:

generate an instruction which when executed configures an access system to revoke at least one permission associated with the first principal node or the second principal node, upon detection of the permission escalation event.

* * * * *